United States Patent
Hofmann et al.

(10) Patent No.: US 11,772,401 B2
(45) Date of Patent: Oct. 3, 2023

(54) METHODS FOR PRINTING IMAGES ON SUBSTRATES AND CORRESPONDING SYSTEMS

(71) Applicant: SCHOTT AG, Mainz (DE)

(72) Inventors: Oliver Hofmann, Egelsbach (DE); Alexander Erb, Mainz (DE); Stephanie Mangold, Schornsheim (DE)

(73) Assignee: SCHOTT AG, Mainz (DE)

( * ) Notice: Subject to any disclaimer, the term of this patent is extended or adjusted under 35 U.S.C. 154(b) by 3 days.

(21) Appl. No.: 17/398,844

(22) Filed: Aug. 10, 2021

(65) Prior Publication Data

US 2022/0048304 A1 Feb. 17, 2022

(30) Foreign Application Priority Data

Aug. 11, 2020 (EP) .................................... 20190556

(51) Int. Cl.
| | |
|---|---|
| *B41J 29/393* | (2006.01) |
| *B41M 5/00* | (2006.01) |
| *B41J 3/407* | (2006.01) |
| *C03C 17/00* | (2006.01) |
| *G06K 15/10* | (2006.01) |
| *G06K 15/02* | (2006.01) |

(52) U.S. Cl.
CPC ............ *B41M 5/0047* (2013.01); *B41J 3/407* (2013.01); *C03C 17/002* (2013.01); *G06K 15/102* (2013.01); *G06K 15/1872* (2013.01); *C03C 2218/119* (2013.01)

(58) Field of Classification Search
CPC .... B41J 2203/01; B41J 2/2139; B41J 2/2142; B41J 29/393; B41J 2/2132; G06K 15/021; G06K 15/027; G06T 2207/30144
See application file for complete search history.

(56) References Cited

U.S. PATENT DOCUMENTS

| | | |
|---|---|---|
| 2011/0249056 A1 | 10/2011 | Weingartner |
| 2019/0220971 A1 | 7/2019 | Weaver |
| 2019/0340740 A1* | 11/2019 | Li ............................ G01J 3/465 |
| 2020/0108632 A1 | 4/2020 | Billow |
| 2021/0118114 A1* | 4/2021 | Yosefi ................. H04N 1/32651 |
| 2021/0183036 A1* | 6/2021 | Gurudath ................ B41J 2/2142 |
| 2022/0194093 A1* | 6/2022 | Huang ................... B41J 2/2132 |

FOREIGN PATENT DOCUMENTS

| | | | | |
|---|---|---|---|---|
| DE | 102019208149 A1 | * | 1/2020 | .......... B41J 2/16579 |
| DE | 102019208257 A1 | * | 1/2020 | .......... B41F 33/0036 |
| EP | 3421250 | | 1/2019 | |
| EP | 3628500 | | 4/2020 | |

OTHER PUBLICATIONS

ISO/IEC 24790, "Information technology—Office equipment—Measurement of image quality attributes for hardcopy output—Monochrome text and graphic images", first edition, Feb. 2017, 74 pages.

* cited by examiner

*Primary Examiner* — Julian D Huffman
(74) *Attorney, Agent, or Firm* — Ruggiero McAllister & McMahon LLC (57) ABSTRACT

A method for printing an image on a substrate is provided. The method includes: providing image template data; analyzing the image template data by identifying image components; printing the image using the image template data using a printing procedure based on printing parameters with a printer operating using printer configuration parameters; capturing the printed image; providing captured image data of the captured image; analyzing the captured image data. The analyzing including determining the region of interest within the captured image data based on definition parameters, identifying an image component and an image metric for the region of interest, relating the image metric to the image component, relating the identified image component to the identified image component of the region of interest, selecting parameters based on the image metric and/or the image component, and computing an actual correction parameter based on an optimization computing procedure using the image metric.

16 Claims, 7 Drawing Sheets

FIG. 1

| Large area image quality attributes | | |
|---|---|---|
| Large area darkness | | Darkness of image |
| Background darkness | | Darkness of background |
| Graininess | | Microscopic white noise |
| Mottle | | Macroscopic white noise |
| Background extraneous mark | | Splatter in background |
| Large area void | | Holes in image |
| Banding | | Lines in image |

METHODS FOR PRINTING IMAGES ON SUBSTRATES AND CORRESPONDING SYSTEMS

CROSS REFERENCE TO RELATED APPLICATIONS

This application claims benefit under 35 USC § 119 of European Application No. 20 190 556.9 filed Aug. 11, 2020, the entire contents of which are incorporated herein by reference.

BACKGROUND

1. Field of the Invention

The present invention relates to a method for printing an image on a substrate, preferably glass, ceramics or glass ceramics. The present invention further relates to a system for printing an image on a substrate, preferably glass, ceramics or glass ceramics. The present invention further relates to a non-tangible computer-readable medium storing a program comprising computer-readable instructions causing a computer or a network of computers to perform a method for printing an image on a substrate, preferably glass, ceramics or glass ceramics. Although applicable in general to any printing method the present invention will be described in the context of inkjet printing. Although applicable in general to any kind of substrate the present invention will be described in the context of ceramics.

2. Description of Related Art

A conventional inkjet printing technique and a corresponding machine is for instance shown in EP 3421250 A1. EP 3421250 A1 shows a single-pass digital printing on glass using digital printing heads on a movable printing bridge. These digital printing heads act as a multi-pass for the correction of printing defects detected after the printing, or to make prints of greater complexity. When a defect has occurred during single-pass printing, the defects are detected by optical graphic assistance means connected to a central processing and control unit of the printing machine that may instruct the printing bridge to perform additional high precision passes on the glass to correct the detected defects. These graphic assistance means are for example in the printing bridge that analyzes the printed image and detect defects.

However, one of the problems is that although printing defects may be detected, the method is very time consuming and inefficient: To detect and correct defects, the glass must again be processed multiple times. Further, for detecting the defects the total printing area of the glass has to be checked. Another problem arises since the definition of the defects may vary with the printer and its configuration as well as with the kind of optical graphic assistance means. An even further problem is that the same defects may arise when the same image is printed on the same kind of substrate again.

SUMMARY

It is therefore an object of the present invention to provide a method and a system for printing an image on a substrate, which is more efficient, requires less time for obtaining a printed product and provides a defined quality of printing products for different printers and different images to be printed. In particular, a further object of the present invention is to provide a method and a system enabling a defined printing quality with a reduced number of defects for a number of substrates of the same kind as well as for a number of same images to be printed. A further object of the present invention is to provide an alternative method and an alternative system for printing an image on a substrate.

In an embodiment, the present invention provides a method for printing an image on a substrate, preferably glass, ceramics or glass ceramics, comprising the steps of: Providing image template data for an image to be printed by an image providing computing entity, Analyzing the image template data by identifying image components of the image, Providing a substrate for printing the image thereon by a substrate feeding entity, Providing an ink for printing the image by an ink supply entity, Printing the image using the image template data on the substrate with the ink using a printing procedure, preferably Inkjet-Printing-procedure, based on printing parameters with a printer operating using printer configuration parameters, Capturing the printed image on the substrate by one or more image capturing entities, and providing captured image data of the captured image, Analyzing the captured image data, using an analyzing procedure by an analysis computing entity. The analyzing procedure comprising Providing definition parameters for defining at least one region of interest, ROI; Determining the at least one ROI within the captured image data based on the provided definition parameters; Identifying in the at least one ROI at least one image component; Determining for the at least one ROI at least one image metric; and Relating the at least one image metric to the at least one image component, Relating the identified at least one image component in the image template data to the at least one identified image component of the at least one ROI related with the at least one image metric, Selecting one or more printer configuration parameters and/or printing parameters for correction, preferably based on at least one image metric and/or at least one image component, Computing at least one actual correction parameter for the selected printer configuration parameters and/or the selected printing parameters based on an optimization computing procedure using the at least one image metric, wherein the at least one actual correction parameter being image component specific.

In a further embodiment, the present invention provides a system for printing an image on a substrate, preferably glass, ceramics or glass ceramics comprising: an image providing computing entity for providing image template data for an image to be printed, an image analyzing entity for analyzing the image template data by identifying image components of the image, a substrate feeding entity for providing a substrate for printing the image thereon, an ink supply entity for providing an ink for printing the image, a printer adapted to print the image using the image template data on the substrate with the ink using a printing procedure, preferably Inkjet-Printing-procedure, based on printing parameters with the printer operating using printer configuration parameters, one or more image capturing entities for capturing the printed image on the substrate and providing captured image data of the captured image, an analysis computing entity for analyzing the captured image data using an analyzing procedure, adapted to perform the steps of: Providing definition parameters for defining at least one region of interest, ROI; Determining the at least one ROI within the captured image data based on the provided definition parameters; Identifying in the at least one ROI at least one image component; Determining for the at least one ROI at least one image metric; and Relating the at least one image metric to the at least one image component. A relation computing entity for relating the identified at least one image component in the image template data to the at least one identified image component of the at least one ROI related with the at least one image metric, a selection entity for selecting one or more printer configuration parameters and/or printing parameters for correction, preferably based on at least one image metric and/or at least one image component, a correction computing entity for computing at least one actual correction parameter for the selected printer configuration parameters and/or the selected printing parameters based on an optimization computing procedure, using the at least one image metric, wherein the at least one actual correction parameter being image component specific.

In a further embodiment, the present invention provides a non-tangible computer-readable medium storing a program comprising computer-readable instructions causing a computer or a network of computers to perform a method for printing an image on a substrate, preferably glass, ceramics or glass ceramics comprising the steps of: Providing image template data for an image to be printed by an image providing computing entity; Analyzing the image template data by identifying image components of the image; Providing a substrate for printing the image thereon by a substrate feeding entity; Providing an ink for printing the image by an ink supply entity; Printing the image using the image template data on the substrate with the ink using a printing procedure, preferably Inkjet-Printing-procedure, based on printing parameters with a printer operating using printer configuration parameters; Capturing the printed image on the substrate by one or more image capturing entities, and providing captured image data of the captured image; and Analyzing the captured image data, using an analyzing procedure by an analysis computing entity. The analyzing procedure comprising: Providing definition parameters for defining at least one region of interest, ROI; Determining the at least one ROI within the captured image data based on the provided definition parameters; Identifying in the at least one ROI at least one image component; Determining for the at least one ROI at least one image metric; Relating the at least one image metric to the at least one image component; Relating the identified at least one image component in the image template data to the at least one identified image component of the at least one ROI related with the at least one image metric; Selecting one or more printer configuration parameters and/or printing parameters for correction, preferably based on at least one image metric and/or at least one image component; and Computing at least one actual correction parameter for the selected printer configuration parameters and/or the selected printing parameters based on an optimization computing procedure using the at least one image metric, wherein the at least one actual correction parameter being image component specific.

One of the advantages which may be provided by at least one of the embodiments is an optimized printing product. A further advantage may be that in particular due to defining ROIs, printing and detecting of defects can be performed in much lesser time, therefore enhancing efficiency. A further advantage may be that different printing qualities can be compared quickly and easily according to defined parameters. An even further advantage may be that providing the same printed product in a large amount with enhanced quality.

The terms "entity" and "storage entity" refer each to a device adapted to perform computing like a personal computer, a tablet, a mobile phone, a server, or the like and comprise one or more processors having one or more cores and may be connectable to a memory for storing one or more applications, which is/are adapted to perform corresponding steps of one or more of the embodiments of the present invention. Any application may be software-based and/or hardware-based installed in the memory on which the processor(s) can work on. The devices, entities or the like may be adapted in such a way that the corresponding steps to be computed are performed in an optimized way. For instance, different steps may be performed in parallel with a single processor on different of its cores. Further, different storage entities may be identical forming a single storage computing device. The device or devices may also be instantiated as a virtual device running on a physical computing resource. Different devices may therefore be executed on the physical computing resource.

The terms "computing device" or "computing entity", "computing device", etc. refer each to a device adapted to perform computing like a personal computer, a tablet, a mobile phone, a server, or the like and comprise one or more processors having one or more cores and may be connectable to a memory for storing an application, which is adapted to perform corresponding steps of one or more of the embodiments of the present invention. Any application may be software based and/or hardware based installed in the memory on which the processor(s) can work on. The computing devices or computing entities may be adapted in such a way that the corresponding steps to be computed are performed in an optimized way. For instance, different steps may be performed in parallel with a single processor on different of its cores. Further, the computing devices or computing entities may be identical forming a single computing device. The devices or devices may also be instantiated as a virtual device running on a physical computing resource. Different devices may therefore be executed on the physical computing resource. The devices or entities may each have one or more interfaces to communicate with the environment, e.g. other devices, humans, etc.

The term "computer readable medium" or "storage medium" may refer to any kind of medium, which can be used together with a computation device or computer and on which information can be stored. The information may be any kind of data, which can be read into a memory of a computer. For example, the information may include program code for executing with the computer. Examples of a computer readable medium are tapes, CD-ROMs, DVD-ROMs, DVD-RAMs, DVD-RWs, BluRay, DAT, MiniDisk, solid state disks SSD, floppy disks, SD-cards, CF-cards, memory-sticks, USB-sticks, EPROM, EEPROM or the like.

The term "printed product" refers to one or more physical objects, which can be manufactured like glass, ceramics, etc. and on which one or more images have been printed on. In general, any kind of physical object, which can be manufactured or physically provided can be seen as a "product".

The optimization procedure may include but is not limited to one of the following optimization algorithms or a combination of at least two optimization algorithms: Ad-hoc On-demand Distance Vector; Ant colony optimization algorithm; Approximation algorithms; Back propagation; Hill climbing algorithm; Broyden-Fletcher-Goldfarb-Shanno (BFGS) algorithm; Bisection method; Borůvka's algorithm; Branch-and-Bound; Branch-and-Cut; Christofides algorithm; Conjugate gradient method; Covariance Matrix Adaptation Evolution Strategy; Constrained Shortest Path First; D Star algorithm; Dijkstra's Shortest Path First algorithm; Dinic's algorithm; Nelder-Mead method; Edmonds-Karp algorithm; Ellipsoid method; Ford-Fulkerson algorithm (FFA); Gauss-Newton algorithm; Push-relabel algorithm; Gotoh-algorithm; Gradient descent algorithm; Greedy algorithm; Hopcroft-Karp algorithm; Interior-point methods; Johnson algorithm; Kruskal's algorithm; Lee algorithm; Levenberg-Marquardt algorithm; Linear optimization; Line search algorithm; Method of Moving Asymptotes; Metropolis-Hastings algorithm; Modified distribution method/u-v-method; Minimum spanning tree; Nature analoguous optimization; Needleman-Wunsch-algorithm; Network simplex algorithm; Nussinov-Algorithmus; Multi-objective optimization; Particle swarm optimization; Pivot algorithms; Prim's algorithm; Quasi-Newton methods; Adjusted Winner procedure; Threshold accepting procedure; Simplex algorithm; Simulated Annealing algorithm; Great Deluge algorithm; Smith-Waterman-algorithm; Spanning Tree Protocol; Folded Spectrum Method; Stochastic tunneling, Tabu search; Trust-Region-method; Viterbi algorithm; and Stepping-Stone-Method.

Further features, advantages and preferred embodiments are disclosed or may become apparent in the following.

According to an embodiment, the method comprises the further steps of thermal fixing of the printed image by a thermal fixing entity, determining at least one of optical, chemical and mechanical properties of the thermally fixed image by a thermal fixing measuring entity and providing data of the properties for the analyzing procedure by the thermal fixing measuring entity. This further enhances the quality of the printed product as well as future printed products of the same kind. In particular, data about the mechanical, physical or optical properties of the products can be obtained which can be used for optimizing the whole printing process.

According to a further embodiment, the definition parameters and the image metrics are based on at least ISO/IEC 24790:2017(E) or newer versions. This allows an easy and defined comparison of printed products. Any further, newer, more recent versions of ISO/IEC 24790 or a combination of different versions may also be used for providing definition parameters and image metrics. Examples of definition parameters and image metrics are given below in the context of FIGS. 1 and 2.

According to a further embodiment, at least one of the image metrics, the captured image data, image template data, correction parameters, selection parameters are stored in a storage entity and/or on a portable storage medium. One of the advantages is that a centralized entity in form of the database can provide corresponding data for analysis for a plurality of users. A portable storage medium has the advantage of being more flexible, for instance, data read from the storage medium can be made available via a software application or the like. The software application—and also the database—may store the data and the metrics in any appropriate format, for instance as TXT-files or the like and convert the corresponding data when delivering the data for analysis to a further entity into an appropriate format necessary for processing by the further entity.

According to a further embodiment, the optimization computing procedure is based on machine learning procedures, preferably performed using neural networks. This enables in an efficient way to learn correlations between the parameters of the printing process on the one hand and the defects of the printed products on the other hand enabling for future printed products an enhanced quality.

According to a further embodiment, all steps are performed repeatedly, preferably for a plurality of substrates on which the same image and/or at least one same image component is printed. This enables a refinement of the correction parameters enabling for future printed products an even further enhanced image or printing quality.

According to a further embodiment for determining an image metric, a wavelet-transform procedure and/or a fourier-transform procedure is performed for data of the ROI. A wavelet transform provides better results than a short time Fourier transform and enables obtaining precise image metrics. A wavelet transform, in particular a discrete wavelet transform DWT is a recursive application of an iterative low- and high-pass filtering with reducing resolution until the signal length corresponds to the filter length. A fourier transform enables an easier implementation and requires less computational resources.

According to a further embodiment, a single overall metric is determined for the at least one image metrics to determine the image quality and the single overall metric is a weighted sum of at least two metrics. One of the advantages is that a quick and easy comparison of the quality of different images can be obtained.

According to a further embodiment the step of selecting includes the steps of: Computing for each printer configuration parameter and/or printing parameter of a plurality of printer, configuration parameters and/or printing parameters an impact value related to an enhancement or deterioration of at least one image metric, and Selecting one or more printer configuration parameters and/or printing parameters based on one or more impact values.

This enables in an easy and effective way to choose or select a number of parameters for optimization for subsequent printing results when being optimized.

According to a further embodiment the one or more of the highest impact values are used for selecting the one or more printer configuration parameters and/or printing parameters. This enables in an even more efficient way to choose or select automatically a limited number of parameters for optimization for subsequent printing results when being optimized which have the biggest impact on the printing results.

According to a further embodiment a model is generated based at least on the selected printer configuration parameters and/or printing parameters, the model describing a relation between printer configuration parameters and/or printing parameters and at least one image metric for at least one image component, preferably wherein the model is generated using artificial intelligence, preferably machine learning procedures, preferably deep learning procedures, preferably neural networks. A model allows to map different image components to different image metrics independent of the image template data and independent of the captured image data. In other words for each image component an image metric can be provided which can be obtained from a plurality of comparisons between the image template data and the extracted data of image components of captured images. Consequently when printing future images comprising image components a printing image with enhanced image quality in some or all image components can be achieved.

The generated model can be based on one or more of following models types of models: statistical models or dynamic models, dynamic models including time-discrete models, time-continuous models, space-discrete models, space-continuous models.

According to a further embodiment the plurality of printer configuration parameters and/or printing parameters is obtained by performing all steps again for a number of repetitions, preferably including the steps of: Comparing the at least one image metric with prior determined corresponding metrics and/or one or more predetermined corresponding thresholds by a comparing computing entity, and Providing correction parameters for the printer configuration parameters and/or the printing parameters based on the comparing by a correction computing entity such that the difference between previous and the correction parameters is minimized.

This allows a continuous refining of correction parameters also taking into account when printing conditions changing slowly over time.

According to a further embodiment of the system, the system further comprises a storage entity, preferably a database and/or a portable storage medium for storing at least one of the image metrics, the captured image data, image template data, correction parameters, selection parameters. One of the advantages is that a centralized entity in form of the database can provide corresponding data for analysis for a plurality of users whereas a portable storage medium provides easy and flexible handling.

According to a further embodiment of the system, the thermal fixing measuring entity is adapted to perform thermal stress analysis. This enables in an easy way to determine the mechanical, chemical and/or physical properties of the printed product which data can be further used for optimizing the printing process.

According to a further embodiment, the system further comprises a machine learning computing entity connected to the storage entity and/or the storage medium, acting as relation computing entity and/or correction computing entity and being adapted to perform machine learning, preferably using neural networks. This enables in an efficient way to learn correlations between the parameters of the printing process on the one hand and the defects of the printed products on the other hand enabling for future printed products an enhanced quality.

According to a further embodiment, the substrate feeding entity provides a substrate in form of a glass object, a ceramic object or a glass ceramic object. This provides in particular a printing of images on glass or glass ceramics.

There are several ways how to design and further develop the teaching of the present invention in an advantageous way. In connection with the explanation of the preferred embodiments of the invention by the aid of the drawing, generally preferred embodiments and further developments of the teaching will be explained.

DETAILED DESCRIPTION

Figure 1:
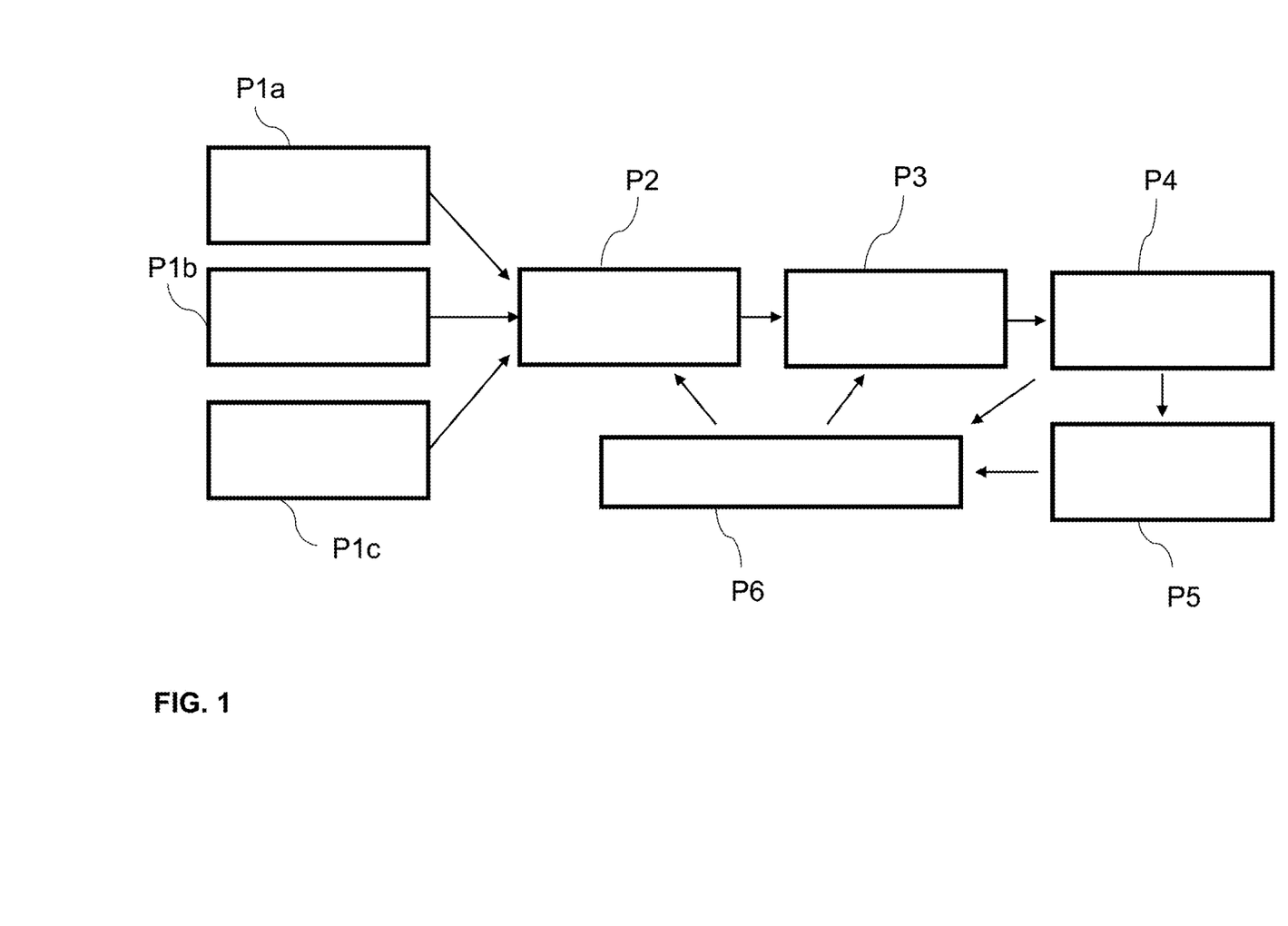
FIG. 1 shows steps of a method according to an embodiment of the present invention.

FIG. 1 shows steps of a method according to an embodiment of the present invention.

In detail FIG. 1 shows providing P1a of digital image data to be printed and parameters specifying the digital image like resolution of the image to be printed, size of the image to be printed, etc. The digital image data is considered to be "constant" and provided by a client.

Further FIG. 1 shows providing P1b of a substrate on which the image is to be printed on and parameters specifying the substrate like substrate material, preconditioning of the substrate, cleaning of the substrate, etc. The substrate is considered to be "constant" and provided by a client.

Even further FIG. 1 shows providing P1c of printing ink including parameters specifying the printing ink like pigment data, frit data, solvent, binder, etc.

All these provided data, parameters, ink and substrate in steps P1a-P1c are provided to a printer in a step P2 to be used for configuring the printer and for the printing process performed by the printer. In a further step, P3, the printing process is carried out by printing the image onto the substrate, wherein the printing process is defined by printing process parameters. The outcome P4 of the printing process is a substrate on which an image was printed on. The printed substrate comprises certain optical, mechanical and chemical properties. In an alternative additional step, which may be required by a customer or client, thermal fixing in a step P5 may be performed such that the mechanical, chemical and/or optical properties of the printed substrate are fixed. A thermal stress analysis TSA can provide information about the physical, chemical and optical properties of the printed product. For instance thermographic cameras, etc. can be used and the obtained data can together with the optical data described below.

Optical means detect properties of the printed substrate and its image and corresponding processing means compute in a further step P6, a parameter or a set of parameters representing a combined or overall property or certain defined properties of the printed image on the substrate with regard to defects. A further processing may provide correction parameters for the printer P2 and correction parameters for the printing process P3 to minimize the determined defects for future printed substrates of the same kind.

The optical means, for instance a plurality of cameras, capture, for example the printed image under different angles, different wavelengths, different focusses, etc. and may further comprise different light sources for emitting light with different wavelengths onto the printed image on the substrate. For instance thermographic cameras, etc. can be used.

In step P6, the captured image data can be as mentioned above processed to obtain an overall value specifying the quality of the printed image. ISO Norm 24790, here ISO/IEC 24790:2017(E), first edition 2017-02 is used and this ISO norm is herein incorporated by reference, provides at least 14 parameters for evaluation.

In the following an overview over variables for assessing an image quality and measurement of image quality attributes are provided. A detailed explanation is given in the above-mentioned ISO norm ISO/IEC 24790:2017(E).

The following definitions apply.

Reflectance factor R is defined as ratio of the reflected flux as measured to the reflected flux under the same geometrical and spectral conditions for an ideal 100% diffuse reflecting surface.

Reflectance threshold:

$$R_{min}+n(R_{max}-R_{min})$$

Edge threshold: 40% of the transition from the minimum reflectance factor ($R_{min}$) to the maximum reflectance factor ($R_{max}$)

$$R_{40}=R_{min}+0.4(R_{max}-R_{min})$$

Outer boundary: 70% of the transition from the minimum reflectance factor ($R_{min}$) to the maximum reflectance factor ($R_{max}$)

$$R_{70}=R_{min}+0.7(R_{max}-R_{min})$$

Inner boundary: 10% of the transition from the minimum reflectance factor to the maximum reflectance factor $$R_{10}=R_{min}+0.1(R_{max}-R_{min})$$

Optical density:

$$\text{optical density} = -\log_{10}(R) = \log_{10}\left(\frac{1}{R}\right)$$

Background area: A region outside the edge of any image element, an image element being a single, evidently intentional, object not connected to other objects.

Image area: Region inside portion of the inner boundary.

Region of interest, ROI: Area inside defined boundaries to be analyzed.

In the following large area graphic image quality attributes are described, which can be used to assess the quality of a printed image.

Large area graphic image quality attributes may be defined as follows:

$$\text{Area} > 161 \text{ mm}^2 (=12.7^2 \text{ mm}^2)$$

ROI minimal dimensions: 12.7 mm×12.7 mm (approx. ½ inch²)

Large area $R_{min}$ and $R_{max}$ may be defined as follows.

$R_{min}$ [%]: Average reflectance factor of background area $$R_{min} = \frac{1}{m \cdot n}\sum_x^n \sum_y^m Y^{image}(x, y)$$

n: number of cells in x-direction
m: number of cells in y-direction
$Y^{backgr}(x,y)$: reflectance factor at position (x,y) of background area
$R_{max}$ [%]: Average reflectance factor of image area $$R_{max} = \frac{1}{m \cdot n}\sum_x^n \sum_y^m Y^{backgr}(x, y)$$

n: number of cells in x-direction
m: number of cells in y-direction
$Y^{image}(x,y)$: reflectance factor at position (x,y) of image area A large area darkness metric may be defined as follows:
Large area metric [1/1%]:
Region of interest (ROI) contained wholly within inner boundary ($R_{10}$)
Minimum ROI size 12.7 mm×12.7 mm $$\text{Large area darkness metric} = \log_{10}\left(\frac{1}{\frac{1}{n \cdot m}\sum_x^n \sum_y^m Y^{image}(x, y)}\right)$$

A large area background darkness metric may be defined as follows:
Background darkness metric [1/%]:
Region of interest (ROI) contained wholly within background area
ROI at least 500 μm away from outer boundary ($R_{10}$)
Minimum size 12.7 mm×12.7 mm $$\text{Background darkness metric} = \log_{10}\left(\frac{1}{\frac{1}{n \cdot m}\sum_x^n \sum_y^m Y^{backgr}(x, y)}\right)$$

Graininess [%] may be defined as follows:
appearance of unintended microscopic, but visible aperiodic fluctuations of lightness ROI in image region
Minimum size 12.7 mm×12.7 mm
Preparation test matrix:
Select region→Welvet filter→Remove margins 0.635 mm→Divide into 9×9 tiles (h_min=w_min=1.27 mm)→in title 60×60 reflectance measurements
Graininess measurement procedure may comprise the following steps:
Select region of interest in image,
Measure reflectance R(x,y), G(x,y), B(x,y) of 360000 px,
Convert R, G, B values to CIE value,
Wavelet transform (Daubechies wavelet of order 16 and level n=6)Zero detail components,
Zero approximation component,
Apply inverse wavelet transform,
Remove 0.635 mm on each side,
Divide image into 9×9 tiles,
Compute reflectance variance, $$v_{i,j}\frac{1}{60 \times 60 - 1}\sum_{x=1}^{60}\sum_{y=1}^{60}[Y'_{i,j}(x, y) - \overline{Y}'_{i,j}]^2$$

assuming 60×60=3600 pixels per tile
Compute graininess metric $$\text{Graininess metric} = \sqrt{\frac{1}{9 \times 9}\sum_{i=1}^9\sum_{j=1}^9 v_{i,j}}$$

assuming 9×9=81 tiles
Mottle [%] can in general be determined according to the graininess measurement procedure shown above with a tile size doubled (120×120 px) compared to the graininess tile size, however instead of a Wavelet transform Daubechies wavelet of order 16 and level n=6, a Daubechies Wavelet transform of level 9, order 16 is performed.

A background extraneous mark [%] can be defined and determined as follows:
  Select ROI in background (min size 12.7×12.7 mm) minimum 500 µm apart from outer boundary
  Use edge threshold to
  find marks m of connected pixels with R<$R_{40}$
  compute area $A_m$ and total area $A_{EM}$ of marks as $\sigma(A_m)$
  min($A_m$)=7.850 µm²
  min($A_m$)=7.850 µm²

$$\text{Background extraneaous mark metric} = \frac{A_{EM}}{\text{Total area } ROI}$$

A large area void metric may be defined as follows:
  Select ROI in image area (min size 12.7 mm×12.7 mm)
  Use edge threshold to
  find marks m of connected pixels with R>$R_{40}$
  compute total area $A_v$ of marks
  min ($A_m$)=7.850 µm²

$$\text{Large area void metric} = \frac{A_V}{\text{Total area } ROI}$$

Banding—defined as "appearance of one dimensional bands within an area that should be homogeneous" may be determined as follows:
  Select ROI 150 mm×100 mm in image region,
  Measure reflectance for R(x), G(x), B(x),
  For each R, G, B average in y-direction,
  Convert R, G, B to CIE,
  Calculate L*,
  Modulate L* to L'(x),
  Separate L'(x) into three frequency channels,
  Discard 5 mm on each side for each channel,
  Find local extrema based on their absolute value and pool local extrema using tent-pole summation
  Calculate banding metric:

Banding metric=$3.66\sqrt{M}$

In the following character and line image quality attributes are described, which can be used to assess the quality of a printed image:
  Character and line image $R_{min}$ and $R_{max}$ can be determined as follows:
    Measure three or more positions in horizontal and vertical direction in image and background area
    Determine $R_{min}$[%] and $R_{max}$[%] as average
  A line width L [µm] may be defined and determined as follows:
    Select ROI such that
    ROI includes line and background
    height is ≥5 mm
    width is ≥2 (line width)+2 mm
    particles of diameter≥100 µm are removed for measurement
    Compute edge threshold $R_{40}$
    Compute line width [µm] as average distance between right edge and left edge $$\text{Line width metric} = \frac{1}{N}\sum_{i=1}^{N}\left|\left(X_i^{\text{left edge}} - X_i^{\text{right edge}}\right)\right|$$

A character darkness may be defined and determined as follows:
  ROI selected as for line width
  Compute $R_{25}$
  Compute average line image density <$\rho$> in $R_{25}$ $$<\rho> = \frac{1}{m \cdot n}\sum_{x}^{n}\sum_{y}^{m}\log_{10}\left(\frac{1}{R(x,y)}\right)$$

Compute character darkness metric [$\sqrt{\mu m}$/%]
Character darkness metric=<$\rho$>·$\sqrt{L}$
A blurriness may be defined and determined as follows:
  ROI selected as for line width
  Compute average distance between $R_{10}$ and $R_{70}$
  Computer average line image density <$\rho$> in $R_{25}$ $$<\rho> = \frac{1}{m \cdot n}\sum_{x}^{n}\sum_{y}^{m}\log_{10}\left(\frac{1}{R(x,y)}\right)$$

Compute average blurriness B1

$$\text{Average bluriness metric} = \frac{<\text{dist}(R_{10} \to R_{70})>}{\sqrt{<\rho>}}$$

The reggedness [µm] may be defined as appearance of geometric distortion of an edge from its ideal position and determined as follows:
  ROI selected as for line width
  Fit straight line to $R_{40}$ threshold
  Calculate standard deviation of residuals from fit (perpendicular to straight line)
  Reggedness is average of left and right standard deviations $$\text{Reggedness metric} = \frac{1}{N}\sum_{j=1}^{n}\sqrt{\frac{1}{k-1}\sum_{i=1}^{k}(\text{residuals from a line})^2}$$

A character void may be defined and determined as follows:
  Definition: "appearance of homogeneity of darkness within the boundary of a line segment, character image or other glyph image"
  Uses XOR/OR
  Compares two images and only gives out changed regions
  Character void [%] may be determined by the following steps:
    Select ROI (text and background),
    Compute $R_{25}$ and transform to binary,
    Remove small scattering,
    Fill all holes,
    Compute exclusive OR,
    Fill character design holes,
    Compute image area A4,
    Compute OR image and image area A5,
    Compute character void as A4/A5.
  A character surrounding area extraneous mark may be defined and determined as follows:
    Select ROI of 10 mm length containing both character and background (at least 0.5 mm width)

Compute $R_{40}$ and set as threshold
Compute area of scatter in 500 µm from character edge $A_{EM}$ and total area of $A_{CF}$
Compute CSEAM $$\text{Character surround area extraneaous mark metric} = \frac{A_{EM}}{A_{CF}}$$

A character surround area haze may be defined and determined as follows:
Select ROI of 10 mm length containing both character and background (at least 0.5 mm width)
Compute mean reflectance factor $R_{HC}$ of character surrounding area
Compute background reflectance factor $R_{BKG}$
Compute CSAH as $$\text{Character surround area haze} = \frac{R_{HC}}{R_{BKG}}$$

Figure 1A:
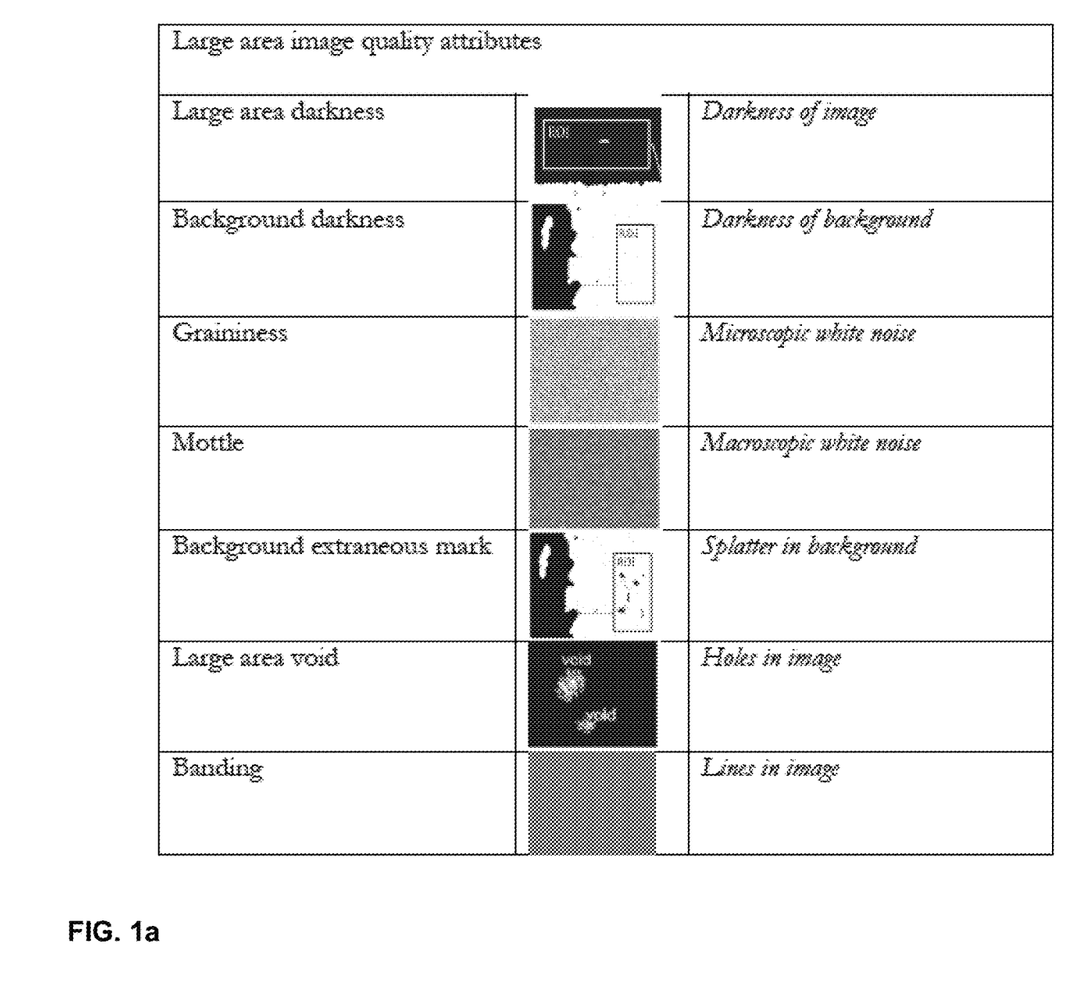
FIG. 1a shows large area image quality attributes compared to the property.
Figure 1B:
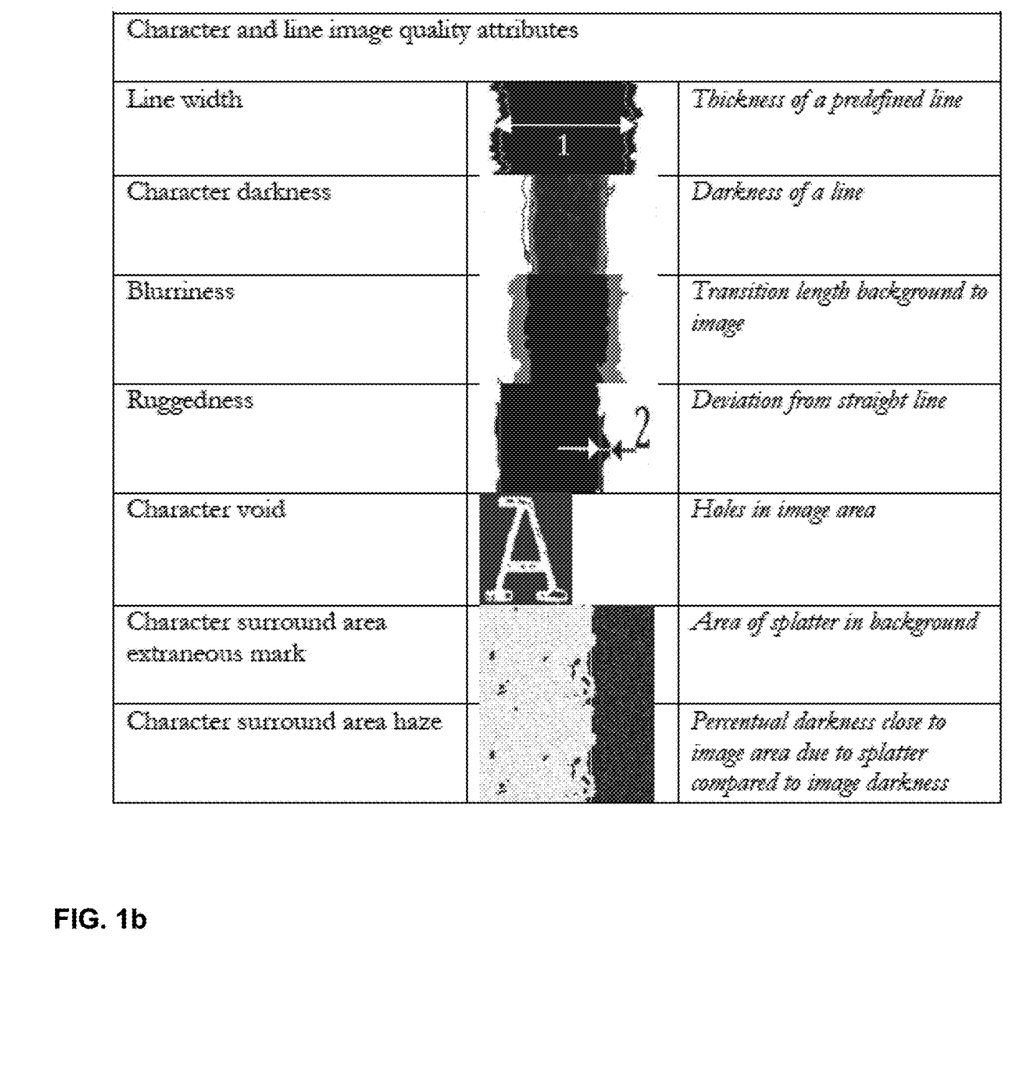
FIG. 1b shows character and line quality attributes compared to the property.

In summary, the large area image quality attributes on the left side of FIG. 1a represent the property on the right side of FIG. 1a. Further, the character and line quality attributes on the left side of FIG. 1b represent the property on the right side of FIG. 1b.

Each of the different metrics as described above can be taken into account when determining an overall metric or parameter(s) for representing the image quality. Different metrics can be weight or the like to take into account different quality requirements of customers for the printed product.

Figure 2:
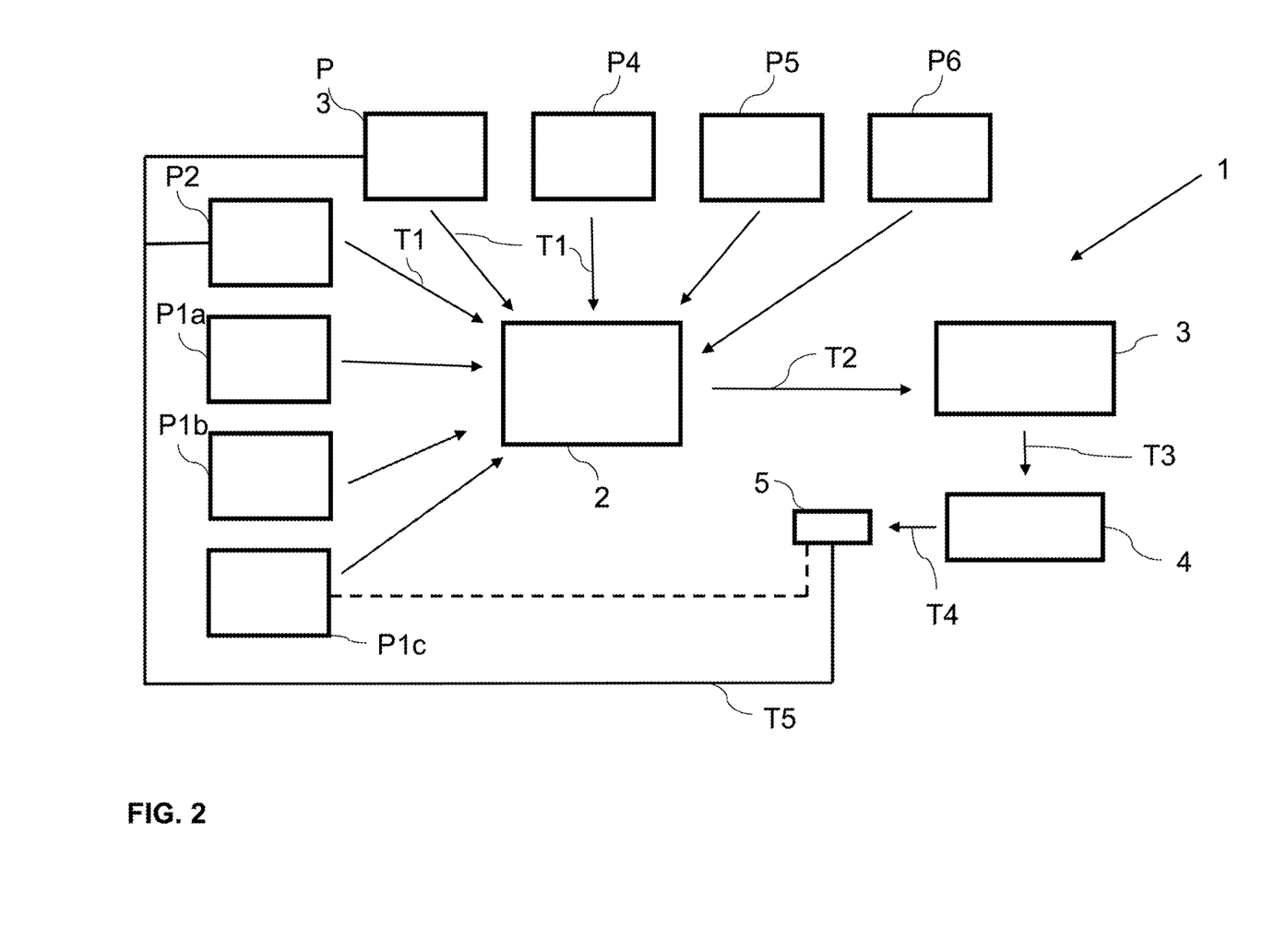
FIG. 2 shows steps of a method according to an embodiment of the present invention.

FIG. 2 shows steps of a method according to an embodiment of the present invention.

In detail in FIG. 2 the parameters defined, provided or obtained prior or after printing of the image (P1a, P1b, P1c, P2-P6) are transmitted in a step T1 to a database 2 for storing. The database 2 may covert the obtained data in a format suitable for storing in the database. A corresponding analyzing entity 3, which may be the database 2 itself or here in FIG. 2 a further external computing entity, may request all or specified data for one or more printed products. This external computing entity 3 may act as analyzing entity for determining correlations between different data of the same or different printed images, substrates, etc. This external computing entity 3 may use any software, for instance Excel®, JMP, Python, R or any other suitable programming language.

The generated results representing the determined correlations are transmitted in a step T3 to a correction computing entity 4, which may also be instantiated within the external computing entity 3. This correction computing entity 4 provides actual correction parameters for the printer configuration parameters and/or the printing parameters based on the comparing such that the difference between previous and the actual correction parameters is minimized.

In a further step T4 the correction parameters and/or updated printer configuration parameters and/or updated printing parameters are transmitted in a further step T5 via corresponding interfaces 5 to the printer P2 and/or for the printing process P3 or if necessary to the ink suppling entity corresponding to step P1c.

FIGS. 1 and 2 show in particular a capturing of images, a "translation" of the captured images into a steady stream of optical property data of the printed images, an analyzing and determination of correlations within the data, and determining of correction parameters to optimize the printing process based on the correlations to comply with customer requirements. Actual products are enhanced and future products can be developed.

Figure 3:
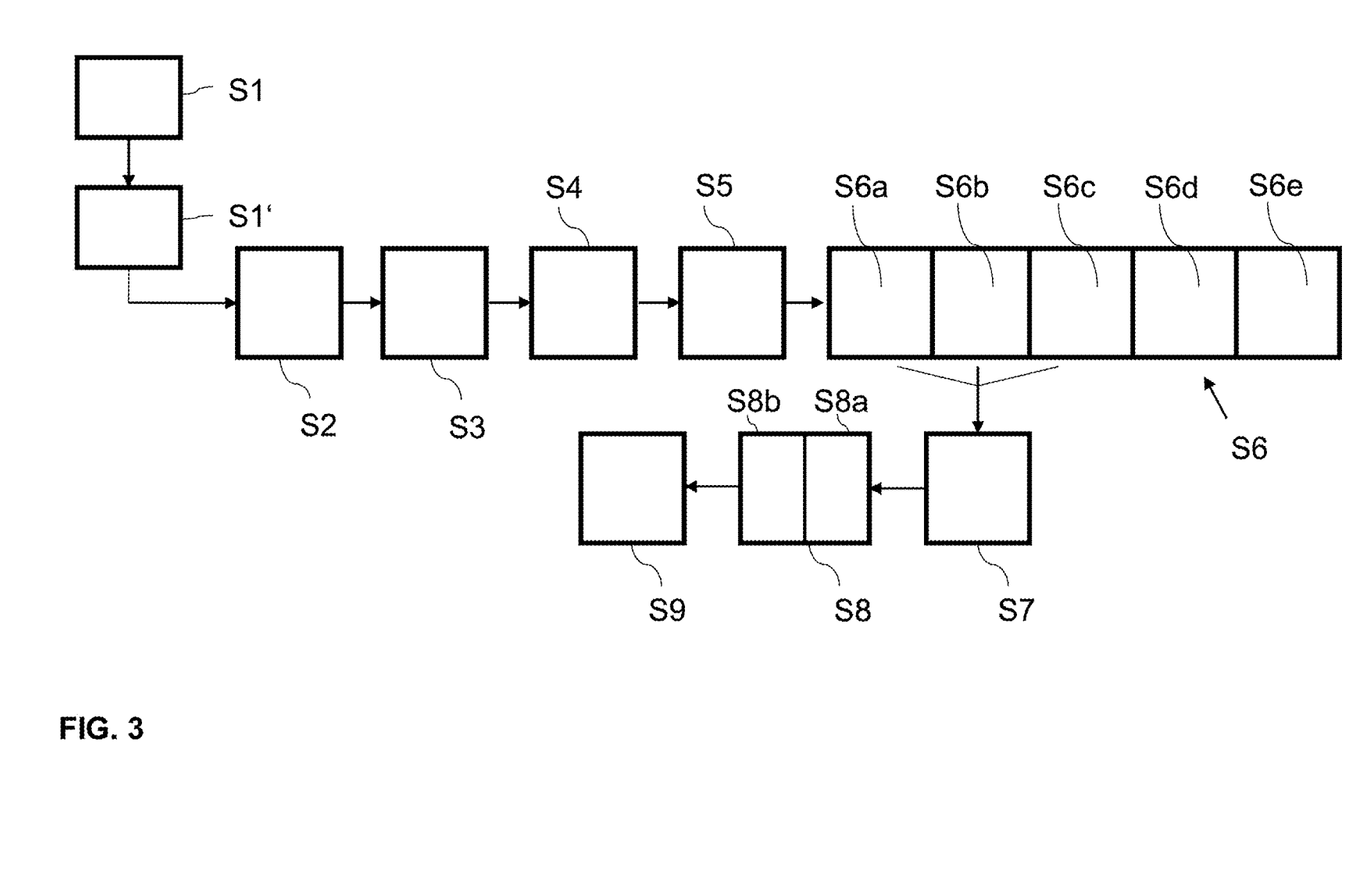
FIG. 3 shows steps of a method according to an embodiment of the present invention.

FIG. 3 shows steps of a method according to an embodiment of the present invention.

In detail, FIG. 3 shows steps of a method for printing an image on a substrate, preferably glass, ceramics or glass ceramics.

The method comprises the following steps:

A first step S1 comprises providing image template data for an image to be printed by an image providing computing entity.

A further step S1' comprises analyzing the image template data by identifying image components of the image. The analysis comprises the division of the image into image characters like lines, large areas or the like. The identified image characters are the basis for the provision of printing parameters for each image character. As aforementioned already described, such image characters are especially areas of the image template that basically differ inter alia in their visual appearance, for example such like characters, lines and/or large areas. The identified characters as such are then the basis for the provision, adaption and/or adjustment of printing parameters for each of the identified image characters inter alia based upon image quality attributes corresponding or related to each image component.

A further step S2 comprises providing a substrate for printing the image thereon by a substrate feeding entity.

A further step S3 comprises providing an ink for printing the image by an ink supply entity.

A further step S4 comprises printing the image using the image template data on the substrate with the ink using a printing procedure, preferably InkJet-Printing-procedure, based on printing parameters with a printer operating using printer configuration parameters.

A further step S5 comprises capturing the printed image on the substrate by one or more image capturing entities and providing captured image data of the captured image.

A further step S6 comprises analyzing the captured image data using an analyzing procedure by an analysis computing entity, the analyzing procedure comprising a first substep S6a, providing definition parameters for defining at least one region of interest, ROI, a further substep S6b, comprising determining the at least one ROI, within the captured image data of the captured image based on the provided definition parameters, a further substep S6c comprising identifying in the at least one ROI at least one image component, a further substep S6d comprising determining for the at least one ROI at least one image metric and a further substep S6e comprising relating the at least one image metric to the at least one image component.

A further step S7 comprises relating the identified at least one image component in the image template data to the at least one identified image component of the at least one ROI related with the at least one image metric.

A further step S8 comprises selecting one or more printer configuration parameters and/or printing parameters for correction, preferably based on at least one image metric and/or at least one image component.

The step S8 of selecting S8 may include the steps of Computing S8a for each printer configuration parameter and/or printing parameter of a plurality of printer configuration parameters and/or printing parameters an impact value related to an enhancement or deterioration of at least one image metric, Selecting S8b one or more printer configuration parameters and/or printing parameters based on one or more impact values, preferably the one or more of the highest impact values are used for selecting the one or more printer configuration parameters and/or printing parameters.

A further step S9 comprises computing at least one actual correction parameter for the selected printer configuration parameters and/or the selected printing parameters based on an optimization computing procedure using the at least one image metric, wherein the at least one actual correction parameter being image component specific.

Figure 4:
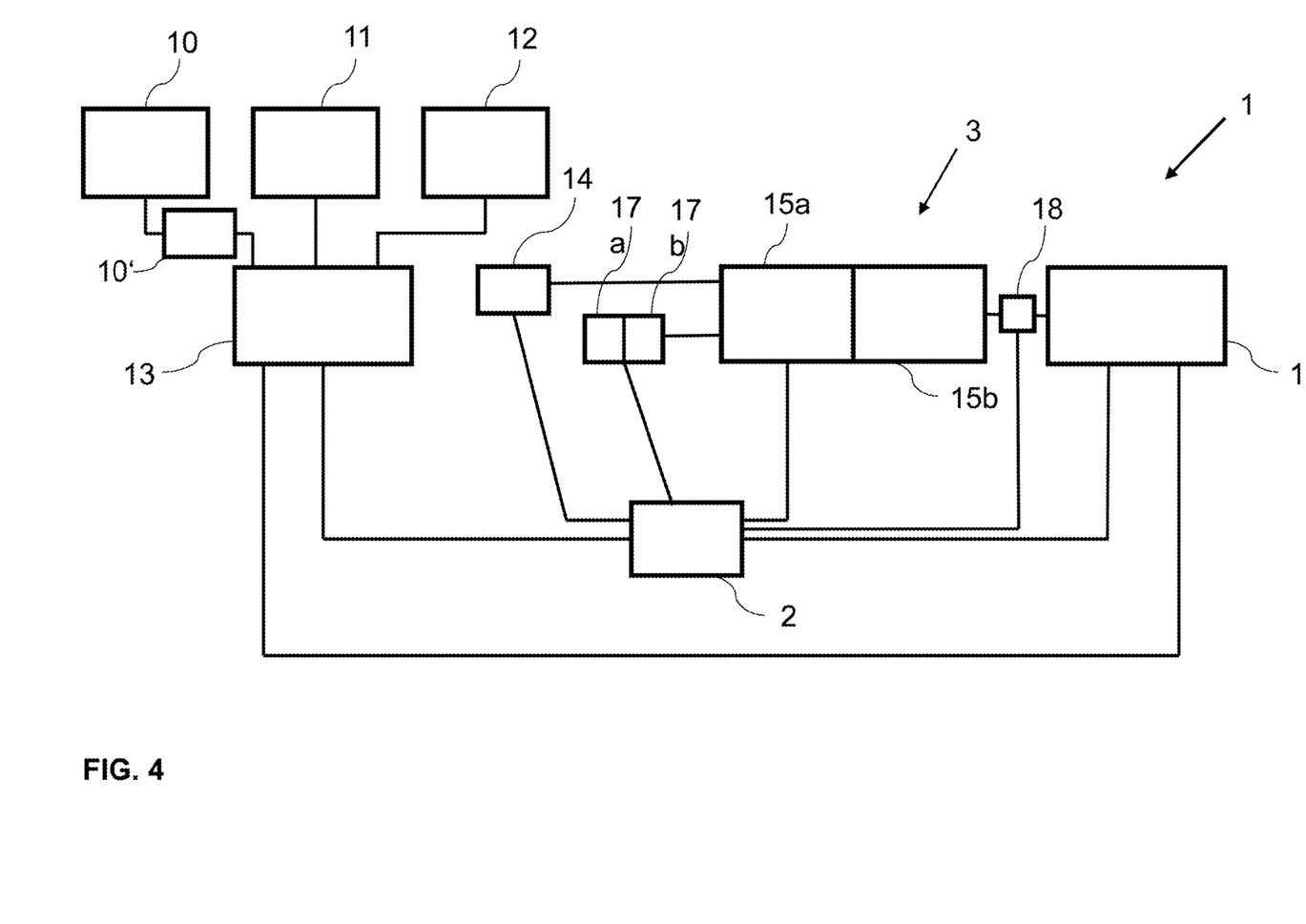
FIG. 4 shows a system according to an embodiment of the present invention schematically.

FIG. 4 shows a system according to an embodiment of the present invention schematically.

In detail, FIG. 4 shows a system 1 for printing an image on a substrate, preferably glass, ceramics or glass ceramics.

The system 1 comprises an image providing computing entity 10 for providing image data for an image to be printed, for instance a computer, an image analyzing entity 10' for analyzing the image template data by identifying image components of the image, a substrate feeding entity 11 for providing a substrate for printing the image thereon, for instance a conveyer belt, and an ink supply entity 12 for providing an ink for printing the image.

Image providing computing entity 10 and image analyzing entity 10', substrate feeding entity 11 and ink supply entity are all connected to a printer 13 adapted to print the image using the image template data on the substrate with the ink using a printing procedure, preferably InkJet-Printing-procedure, based on printing parameters with the printer operating using printer configuration parameters.

During printing and/or after printing of the image onto the substrate, has completed one or more image capturing entities 14 capture the partly or fully printed image on the substrate and provide electronic data of the optically captured image, captured image data The provided electronic data is transmitted to a database 2 to be stored such that an analysis computing entity 15a can request the corresponding data from the database 2. The image capturing entities 14 are therefore connected to the database 2.

A thermal fixing entity 17a may provide thermal fixing of the printed substrate. A corresponding thermal fixing measuring entity 17b may measure the fixed properties, for instance the optical, mechanical and/or optical properties of the printed substrate.

An analysis computing entity 15a is also connected to the database 2 for analyzing the captured image data using an analyzing procedure, adapted to perform the steps of Providing definition parameters for defining at least one region of interest, ROI, Determining the at least one ROI, within the captured image data based on the provided definition parameters, Identifying in the at least one ROI at least one image component, Determining for the at least one ROI at least one image metric, and Relating the at least one image metric to the at least one image component, and a relation computing entity 15b for relating the identified at least one image component in the image template data to the at least one identified image component of the at least one ROI related with the at least one image metric. The entities 15a, 15b form an external computing entity 3 according to FIG. 2.

The results are transmitted to a correction computing entity 16 via a selection entity 18. The selection entity 18 is adapted to select one or more printer configuration parameters and/or printing parameters for correction, preferably based on at least one image metric and/or at least one image component. The correction computing entity 16 is adapted to compute at least one actual correction parameter for the selected printer configuration parameters and/or the selected printing parameters based on an optimization computing procedure, using the at least one image metric, wherein the at least one actual correction parameter being image component specific. The selection entity 18 may for instance select those one or more printer configuration parameters and/or printing parameters for correction having the one or more of the highest impact values.

The correction computing entity 16 may also be connected to the database 2 for storing the computed correction parameters. The selection entity 18 may also be connected to the database to obtain selection data for the parameters, for instance indicating a certain impact to image metrics, previous selection parameters, etc. The correction computing entity 16 may transmit the corresponding correction parameters to the printer 13 for using when printing images on further substrates. The printer 13 itself may request the correction parameters from database 2 if being stored therein. For instance, different correction parameters for different images and different substrates can be stored within the database 2. The printer 13 itself may then request correction parameters when needed for printing. Alternatively the image providing computing entity 10, the image analyzing entity 10', the substrate feeding entity 11 and the ink supply entity 12 each may request itself the correction parameters from the database 2 and feed them to the printer 13.

Figure 5:
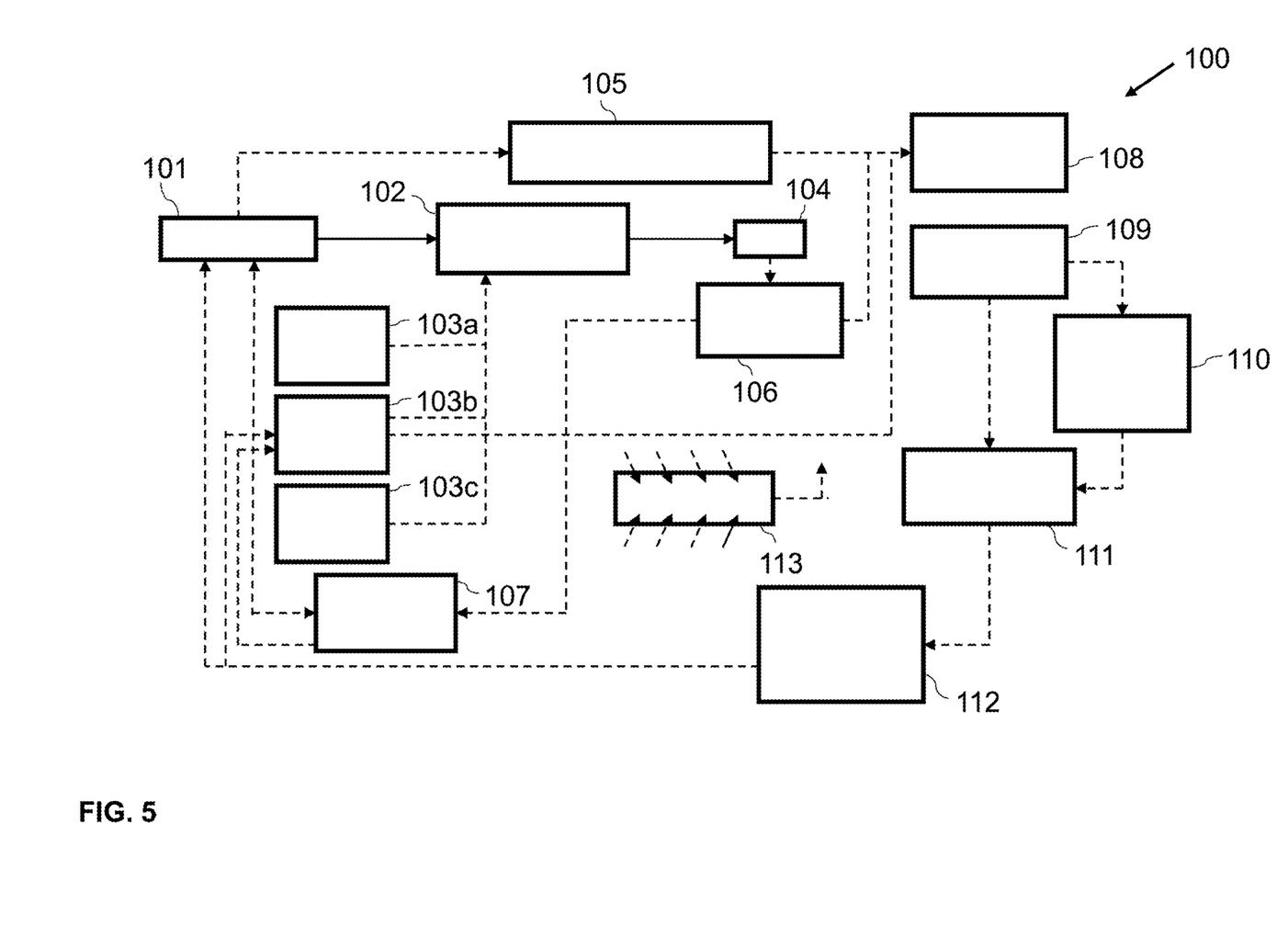
FIG. 5 shows steps of a method according to an embodiment of the present invention.

FIG. 5 shows steps of a method according to an embodiment of the present invention.

In detail FIG. 5 shows a method 100 for printing an image on a substrate, preferably glass, ceramics or glass ceramics.

Reference sign 101 refers to providing an image template. This image template comprises image components, for instance a photo comprises dots, lines, areas and has a certain resolution or the like. The image components of the image template are determined in step 105. Further in step 102 the application or printing technique and a corresponding system is provided, for instance a screen printing system, an ink jet printer or the like and applied on a substrate.

For performing printing further parameters and material may be specified. In step 103a color and expandable material is provided, comprising for instance screen printing paste, ink, pigment data, frit data, solvent, binder, etc. Further in step 103b parameters of the application system, for instance frequencies, movement speed, etc. are provided. Even further in step 103c the substrate is provided on which the image is to be printed on and parameters specifying the substrate like substrate material, preconditioning of the substrate, cleaning of the substrate, form of the substrate like pane, pipe, etc. is provided. The provided parameters and materials are used for printing in step 102.

The outcome 104 of the printing process is a product, for instance a glass cooktop. This product is examined in step 106 and based on this examination quality metrics for the printed image of the substrate and in particular for the image components of the printed image are determined. In step 107 setpoint/actual-value comparison based on the quality metrics is performed and corresponding deviations are determined using also image template data and the deviations are used for adapting the parameters of the application system in step 103b. The quality metrics for an image component describe the quality of a certain area of the image or of the image component. All image component specific quality metrics together form the quality of the whole image.

Parallel to the setpoint/actual-value comparison in step 107 data is collected in step 108 for instance by systematically varying the operation parameters of the application system provided in step 103b based on the identified image components as well as the determined image component specific image quality metrics using DoE, design of experiments. Collection of the data can also be performed by an automatic measuring system at a printer. Then variation of the operation parameters is usually not possible. However, large amounts of data can be obtained.

This collected data is screened specifically with regard to the quality metrics in a further step 109 to determine those parameters having the biggest influence on the quality metrics.

Optionally in a step 110 the collected data can be for instance filtered to provide data suitable for generating a model, e.g. mathematical modelling and generating for instance a linear model, a model based on polynomials or a model using a neural network, etc. In other words step 110 derives a model modelling the relation between image quality metrics for different image components and the application and process parameters of steps 103a-103b and 101.

The result of step 109 and/or the model generated in step 110 is now optimized in step 111 using one or more optimization procedures. The result of the optimization process is performed based on the determined image components (step 112). The result of step 112, in particular optimized parameters for a better image quality are then included for instance in providing the image template (step 101) or in the application parameters (step 103b).

In other words the information of image quality and image components may be used for selecting the one or more optimization algorithms and to determine an optimal operation point for the application system. When the optimal operation point is determined the printing process is adapted accordingly by adapting the image template data or printing process related parameters. Also adapting the printing ink and/or the substrate is possible.

For instance an image template is provided together with an initial set of printing parameters. When using the above-mentioned method, the image template and the printing parameters are optimized regarding the different image components resulting in an enhanced printing quality of the printed image on the substrate. When the corresponding optimal image component specific printing parameters have been determined, a further printing process may be performed as follows: First of all, the image to be printed is analysed with regard to the image components. For every image component a printing task is generated: for instance first the image component "line" is printed using the corresponding set of printing parameters for the image component, then the image component "dot" is printed using the corresponding set of printing parameters for the image component, etc. Of course other methods are possible.

The above-mentioned steps 101-112 may be performed repeatedly. This allows for example the following: The embodiment enables to generate a model resulting in different image components having different image metrics and being related to one or more application parameters together with their behaviour or functional relation when one or more of these application parameters or image template parameters are changed. An advantage may be here, that future printings have a higher image metrics. Also slow deterioration of the printing heads of the printer or the like can be compensated, etc.

All collected or generated data may be stored (step 113) and provided if necessary or upon request or automatically to any of the entities performing steps 101-112.

To summarize at least one embodiment of the present invention may have at least one of the following advantages and/or provides: Linking of client/customer specifications to parameters for the printing procedure; Easy and precise determining of correlations within captured data by analyzing the data; Providing of enhanced printing processes and consequently printed products with a higher quality; Centralized data storage and data provision; Enhanced flexibility regarding the products to be printed and satisfaction of customer requirements; Higher quality of printed products; Scalability, use for a large amount of printed products possible; Fast and efficient printing with a low number of products not satisfying predetermined quality requirements; Easy comparable quality results of printed products.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

LIST OF REFERENCE NUMERALS

1 System
2 Database
3 External computing entity
4 Correction computing entity
5 Interface
10 Image providing computing entity
10' Image analyzing entity
11 Substrate feeding entity
12 Ink supply entity
13 Printer
14 Image capturing entity
15a Analysis computing entity
15b Comparing computing entity
16 Correction computing entity
17a Thermal fixing entity
17b Thermal fixing measuring entity
18 Selection entity
P1a-P1c Steps
P2-P6 Steps
T1-T5 Steps
S1-S9 Steps

What is claimed is:

1. A method for printing an image on a substrate of glass, ceramic, or glass-ceramic, comprising:
   providing digital image template data of the image to be printed by an image providing computing entity;
   analyzing a plurality of image components of the image from the image template data to identify definition parameters;
   feeding the substrate to a printer by a substrate feeding entity;
   printing the image on the substrate based on the image template data with the printer using an ink to produce a printed image on the substrate;
   capturing the printed image on the substrate by one or more image capturing entities to obtain captured image data of the printed image;
   analyzing the captured image data of the printed image using an analyzing procedure in an analysis computing entity, wherein the analyzing procedure comprises:

(a.) providing the definition parameters to define at least one region of interest,
(b.) determining the at least one region of interest in the captured image data based on the definition parameters,
(c.) identifying in the at least one region of interest an image component,
(d.) determining for the at least one region of interest an image metric, wherein the image metric comprises large area image quality attributes, character image quality attributes and line image quality attributes, and
(e.) associating the image metric to the image component,
relating a respective image component of the plurality of image components identified from the image template data to the associated image metric and one image component,
selecting as a selection parameter one or more parameters for correction based on the relating;
computing at least one actual correction parameter specific to the image component using the image metric as an input; and
printing on the substrate according to the at least one actual correction parameter.

2. The method according to claim 1, wherein the printing is by thermal fixing by a thermal fixing entity;
determining at least one of optical, chemical, and mechanical properties of the thermally fixed image by a thermal fixing measuring entity; and
providing data of the determined properties to the analyzing entity as definition parameters.

3. The method according to claim 1, wherein the definition parameters and the image metrics are based on at least ISO/IEC 24790:2017(E).

4. The method according to claim 1, wherein at least one of the image metrics, the captured image data, image template data, correction parameters, selection parameters are stored in a storage entity and/or on a portable storage medium.

5. The method according to claim 1, wherein the computing comprises machine learning performed using neural networks.

6. The method according to claim 1, further comprising repeating the method for a plurality of substrates on which the same image and/or at least one same image component is printed.

7. The method according to claim 1, wherein the determining the one image metric comprises performing a wavelet-transform procedure and/or a fourier-transform procedure for data of the at least one region of interest.

8. The method according to claim 1, wherein the determining the image metric comprises determining a single overall metric, wherein the single overall metric is a weighted sum of at least two metrics.

9. The method according to claim 1, further comprising:
computing one or more impact values related to an enhancement or deterioration of at least one image metric wherein the one or more of the highest impact values are used for selecting one or more printer configuration parameters and/or printing parameters as the parameters for correction.

10. The method according to claim 9, further comprising generating a model based at least on the selected printer configuration parameters and/or printing parameters, the model describing a relation between printer configuration parameters and/or printing parameters and at least one image metric for at least one image component, wherein the model is generated using a procedure selected from a group consisting of artificial intelligence, a machine learning procedure, a deep learning procedure, and a neural network.

11. The method according to claim 1, further comprising:
comparing the at least one image metric with prior determined corresponding metrics and/or one or more predetermined corresponding thresholds by a comparing computing entity, and
providing correction parameters based on the comparing such that a difference between previous and the correction parameters is minimized.

12. A system for printing an image on a substrate made of glass, ceramic, or glass-ceramic, comprising:
an image providing computing entity that provides image template data of the image to be printed;
an image analyzing entity that analyzes a plurality of image components of the image from the image template data to identify definition parameters;
a substrate feeding entity that feeds the substrate to a printer;
an ink supply entity that provides an ink for printing the image;
a printer that prints the image on the substrate based on the image template data with the ink from the ink supply entity to produce a printed image on the substrate;
one or more image capturing entities that obtain captured image date of the printed image;
an analysis computing entity that analyzes the captured image data of the printed image using an analyzing procedure, that comprises:
providing the definition parameters to define at least one region of interest,
determining the at least one region of interest in the captured image data based on the definition parameters,
identifying in the at least one region of interest an image component,
determining for the at least one region of interest an image metric, wherein the image metric comprises large area image quality attributes, character image quality attributes and line image quality attributes, and
associating the image metric to the image component;
a relation computing entity that relates a respective image component of the plurality of image components identified from the image template data to the associated image metric and one image component;
a selection entity that selects as a selection parameter one or more parameters for correction based on the relating by the relation computing entity; and
a correction computing entity that computes at least one actual correction parameter specific to the image component using the image metric as an input so that the printer prints on the substrate according to the at least one actual correction parameter.

13. The system according to claim 12, further comprising a storage entity for storing at least one of the image metrics, the captured image data, image template data, correction parameters, and selection parameters.

14. The system according to claim 13, further comprising a thermal fixing entity that thermal fixes the printed image; and
a thermal fixing measuring entity that determines at least one of optical, chemical, and mechanical properties of the thermally fixed image and provides data of the properties for the analyzing procedure, and/or further comprising a machine learning computing entity connected to the storage entity, the machine learning computing entity functioning as the relation computing entity and/or correction computing entity and being adapted to perform machine learning using neural networks, and wherein the thermal fixing measuring entity performs thermal stress analysis.

15. The system according to claim 12, wherein the substrate feeding entity provides the substrate in the form of a glass object, a ceramic object, or a glass-ceramic object.

16. A non-transitory computer-readable medium storing a program comprising computer-readable instructions causing a computer or a network of computers to perform a method for printing an image on a substrate made of glass, ceramic, or glass-ceramics, comprising the steps of:
- providing digital image template data of the image to be printed by an image providing computing entity;
- analyzing a plurality of image components of the image from the image template data to identify definition parameters;
- feeding the substrate to a printer by a substrate feeding entity;
- printing the image on the substrate based on the image template data with the printer using an ink to produce a printed image on the substrate;
- capturing the printed image on the substrate by one or more image capturing entities to obtain captured image data of the printed image;
- analyzing the captured image data of the printed image using an analyzing procedure in an analysis computing entity, wherein the analyzing procedure comprises:
  - (f.) providing the definition parameters to define at least one region of interest,
  - (g.) determining the at least one region of interest in the captured image data based on the definition parameters,
  - (h.) identifying in the at least one region of interest an image component,
  - (i.) determining for the at least one region of interest an image metric, wherein the image metric comprises large area image quality attributes, character image quality attributes and line image quality attributes, and
  - (j.) associating the image metric to the image component,
- relating a respective image component of the plurality of image components identified from the image template data to the associated image metric and one image component,
- selecting as a selection parameter one or more parameters for correction based on the relating step,
- computing at least one actual correction parameter specific to the image component using the image metric as an input; and
- printing on the substrate according to the at least one correction parameter.

* * * * *